United States Patent [19]
Katayama et al.

[11] Patent Number: 5,086,667
[45] Date of Patent: Feb. 11, 1992

[54] INTAKE SYSTEM FOR AUTOMOBILE ENGINE

[75] Inventors: Kenji Katayama, Hiroshima; Hiroshi Hirano, Hatsukaichi; Toshio Takeda, Hiroshima; Seiji Yashiki, Hiroshima, all of Japan

[73] Assignee: Mazda Motor Corporation, Hiroshima, Japan

[21] Appl. No.: 506,611

[22] Filed: Apr. 10, 1990

[30] Foreign Application Priority Data

Apr. 10, 1989 [JP] Japan .................... 1-43123

[51] Int. Cl.$^5$ ................ B60K 41/06; F02B 75/18
[52] U.S. Cl. ......................... 74/860; 74/844; 74/857; 74/872; 123/52 M; 123/559.1; 123/585; 123/588
[58] Field of Search .............. 74/844, 857–860, 74/873–875; 123/52 M, 559.1, 585, 588

[56] References Cited

U.S. PATENT DOCUMENTS

| | | | |
|---|---|---|---|
| 3,106,104 | 10/1963 | Harry | 74/844 |
| 4,108,127 | 8/1978 | Chapin et al. | 123/588 X |
| 4,474,081 | 10/1984 | Kinugasa et al. | 74/859 X |
| 4,750,386 | 6/1988 | Bowers et al. | 74/873 |
| 4,879,982 | 11/1989 | Itakura et al. | 123/588 X |

FOREIGN PATENT DOCUMENTS

| | | |
|---|---|---|
| 55-125334 | 9/1980 | Japan . |
| 57-131841 | 8/1982 | Japan . |
| 62-37228 | 2/1987 | Japan ................ 74/844 |

Primary Examiner—Leslie A. Braun
Assistant Examiner—Benjamin Levi
Attorney, Agent, or Firm—Fleit, Jacobson, Cohn, Price, Holman & Stern

[57] ABSTRACT

An intake system for an automobile engine with a manual transmission or an automatic transmission has a throttle valve disposed in an intake passage for distributing air into cylinders of the engine. A supplementary air distributor provided in association with the intake passage supplementarily distributes air into the intake passage between the throttle valve and engine. The supplementary air distributor is controlled by a controller to distribute different amount of supplementary air according to engine operating conditions. The controller is correctively controlled to vary the amount of supplementary air, by the supplementary air distributor according to atmospheric pressure for every distribution, so as to distribute a larger amount of supplementary air do an automobile engine with an automatic transmission than do an automobile engine with a manual transmission at the same atmospheric pressure.

6 Claims, 4 Drawing Sheets

INTAKE SYSTEM FOR AUTOMOBILE ENGINE

The present invention relates to an intake system for an automobile engine.

BACKGROUND OF THE INVENTION

An intake system of this type is provided with havings a bypass passage with havings a control valve for allowing a portion of intake air to flow in an intake pipe, bypassing a throttle valve disposed in the intake pipe. The control valve is feedback controlled so that a desired speed of rotation is reached both when an engine is idling while the throttle valve is fully closed and when it is correctively controlled according to atmospheric pressure. That is, when running at high elevations, where atmospheric pressure is low, because intake air pressure or boost pressure in the intake pipe downstream of the throttle valve is low and that the density of air is low, the air absorbing force in the bypass passage is insufficient. For this reason, a control value, by which the control valve of the bypass passage is opened, is increasingly corrected, so as to provide a sufficient quantity of air distributed into the bypass passage. Thereby, a reliable feedback control of engine idling speed is provided. Such an intake system is known from Japanese Unexamined Patent Publication No. 57(1982)-131841, entitled Idle Speed Control System For Internal Combustion Engine, published Sept. 14, 1982.

Transmission cooperating with engines are divided into two types, namely, manual transmissions and automatic transmissions. Because an engine with an automatic transmission is subjected to a larger load than an engine with a manual transmission, boost pressure in the engine with an automatic transmission is closer to atmospheric pressure as compared to an engine with a manual transmission and, accordingly, the difference between atmospheric pressure and boost pressure in the engine with an automatic transmission becomes smaller than in the engine with a manual transmission. A decrease of the pressure difference, which is slight at low elevations where atmospheric pressure is high, becomes significant at high elevations where atmospheric pressure is low. If the intake system cooperating with the automobile engine is operated with an automatic transmission in which air or an air mixture such as purge air is supplementarily supplied into the intake pipe downstream of the throttle valve in the same manner as the intake system cooperating with the automobile engine with a manual transmission, the pressure difference becomes too small at high elevations to provide a sufficient suction force or to assure that a sufficient quantity of supplementary air is supplied into the intake pipe.

SUMMARY OF THE INVENTION

It is, therefore, a primary object of the present invention to provide an intake system in which the supplementary distribution of intake air is corrected according to types of transmissions, thereby preventing supplementary air from insufficiently being applied into an intake pipe of the intake system.

The object of the present invention is achieved by an intake system which is provided as a unit to cooperate with either an automobile engine with a manual transmission or an automotive engine with an automatic transmission. Supplementary air distribution means is provided in cooperation with an intake passage having a throttle valve disposed therein to distribute supplementary air into the intake passage between the throttle valve and automobile engine. The supplementary air distribution means is controlled by a control means to distribute different amounts of the supplementary air according to operating conditions of the automobile engine. The control means correctively changes the amount of the supplementary air by the supplementary air distribution means according to atmospheric pressure for every distribution so as to distribute a larger amount of the supplementary air for an automobile engine with an automatic transmission than for an automobile engine with a manual transmission at a same atmospheric pressure.

In an intake system according to a preferred embodiment of the present invention, the supplementary air distribution means comprises a bypass passage for allowing air in the intake passage to bypass the throttle valve. An idle speed control (ISC), valve is disposed in the bypass passage for changing the amount of air bypassing through the bypass passage and/or a purge passage coupling an oil tank with the intake passage between the throttle valve and automobile engine for allowing air to be distributed. The supplementary air distribution means also includes a purge valve disposed in the purge passage for changing the amount of air passing through the bypass passage.

Because the amount of the supplementary air is changed so as to be larger for an automobile engine with an automatic transmission than for an automobile engine with a manual transmission at the same atmospheric pressure, even if the difference between atmospheric pressure and boost pressure decreases, and the amount of supplementary air supplied is insufficient when the automobile having an automobile engine with an automatic transmission is running at high elevations, the large pressure-depending control value ensures that a large quantity of supplementary air flows into the intake manifold.

BRIEF DESCRIPTION OF THE DRAWINGS

Still other objects of the invention and more specific features will become apparent to those skilled in the art from the following description of the preferred embodiment when considered together with the accompanying drawings, wherein like reference characters have been used in the different figures to denote the same parts.

DESCRIPTION OF THE PREFERRED EMBODIMENT

Because vehicle engines are well known, the present description will be directed in particular to elements forming parts of, or cooperating directly with, the system in accordance with the present invention. It is to be understood that elements not specifically shown or described can take various forms well known to those skilled in the automobile engine art.

Figure 1:
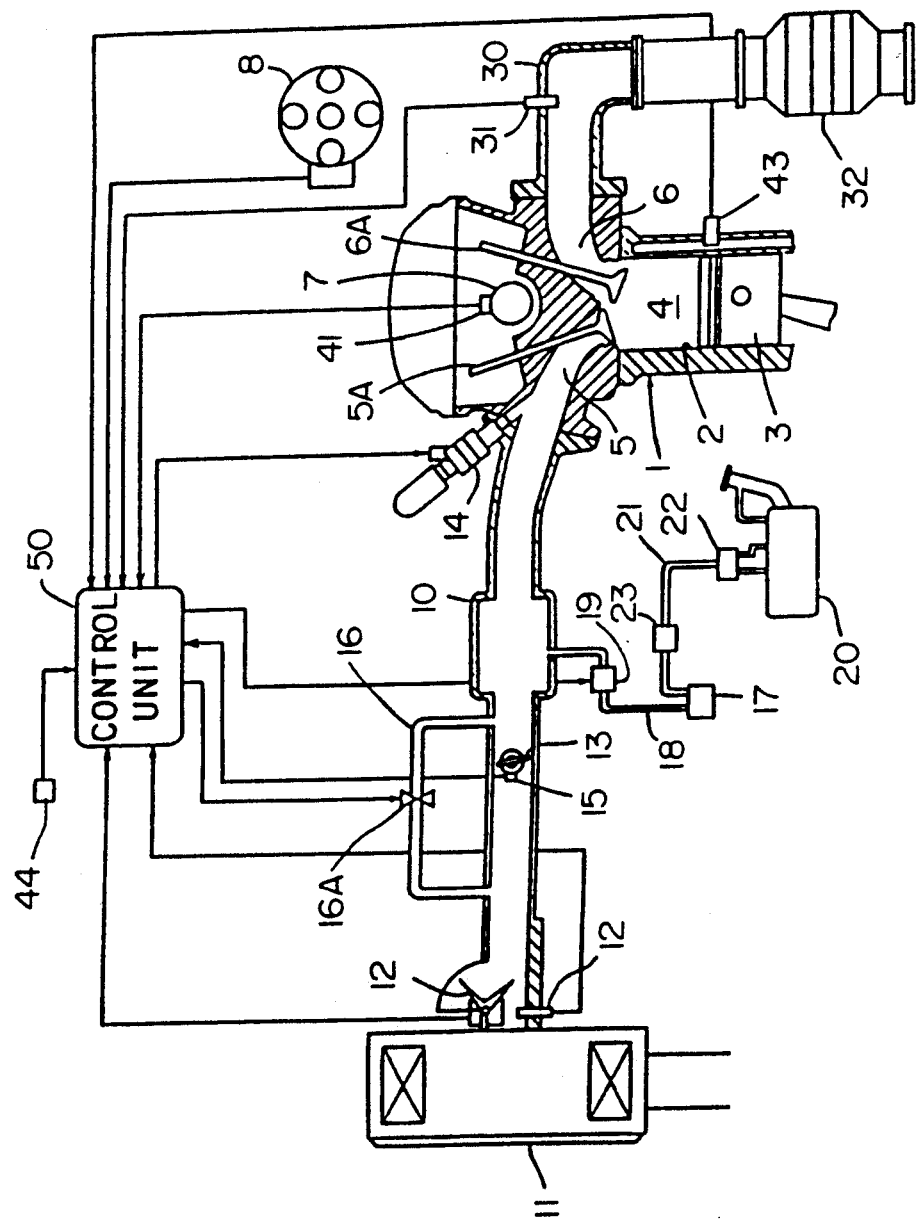
FIG. 1 is a schematic illustration showing an automobile engine with an intake system in accordance with a preferred embodiment of the present invention.

Referring to the drawings in detail, particularly to FIG. 1, an automobile engine having an intake system in accordance with a preferred embodiment of the present invention in shown. The automobile engine has an engine block 1 formed with a cylinder 2 slidably receiving a piston 3 and including a combustion chamber 4 therein. Facing the combustion chamber 4, there are disposed intake an exhaust valves 5A and 6A, which are, respectively, seated in intake and exhaust ports 5 and 6 formed in the engine block 1. These intake and exhaust valves 5A and 6A are timely driven by a cam shaft 7 to open and close the intake and exhaust ports 5 and 6. A spark plug (now shown), which is treaded into the engine block 1 at the top of the combustion chamber 4 and which cooperates with a distributor 8, constitutes a firing system well known in the art. The combustion chamber 4 is in communication with intake and exhaust manifolds 10 and 30.

The intake manifold 10, connecting an air cleaner 11 to the combustion chamber 4, is provided with an airflow sensor 12 disposed adjacent to the air cleaner 11 for determining air flow, a throttle valve 13 after the air-flow sensor 12 for controlling the quantity of air reaching the combustion chamber 4, and a fuel injector 14 disposed adjacent to the intake port 5 for controlling the quantity of fuel supplied, in order. In association with the throttle valve 13, a throttle valve sensor 15 is provided to send an appropriate output signal indicating the opening of the throttle valve 13 to a microcomputer as an engine control unit 50. The intake manifold 10 is further provided with a bypass passage pipe 16 with an idle speed control (ISC) valve 16A, used as primary supplementary air supply means, which allows part of air to flow bypassing the throttle valve 13 so as to supply supplementary air into a downstream part of the intake manifold 10.

Between the throttle valve 13 and fuel injector 14, the intake manifold 10 is connected to a fuel tank 20 via secondary supplementary air supply means comprising a canister 17 for adsorbing evaporated fuel gas and a purge pipe 18. That is, the canister 17 i s connected, on one hand, to the intake manifold 10 between the throttle valve 13 and fuel injector 14 by way of the purge pipe 18 provided with a purge valve 19 for linearly controlling the quantity of evaporated fuel gas into the purge pipe 18 and, on the other hand, to the fuel tank 20 by way of a suction pipe 21 provided with a separator 22 for separating evaporated fuel gas into liquid and gas and a two-way valve 23 for controlling the quantity of evaporated fuel gas into the canister 17, in order from the fuel tank 20.

The exhaust manifold 30, connecting the combustion chamber 4 to a catalytic converter 32 for significantly lowering emission levels of hydrocarbons, carbon monoxide, and in the case of some converters, oxides of nitrogen as is well known in the art, is provided with an oxygen sensor 31 near the exhaust port 6.

The engine control unit 50 receives signals from a crank angle sensor 41 provided in association with the cam shaft 7 for detecting engine speed, an air temperature sensor 42 provided in association with the air-flow sensor 12, an engine coolant temperature sensor 43 and an atmospheric pressure sensor 44.

Figure 2:
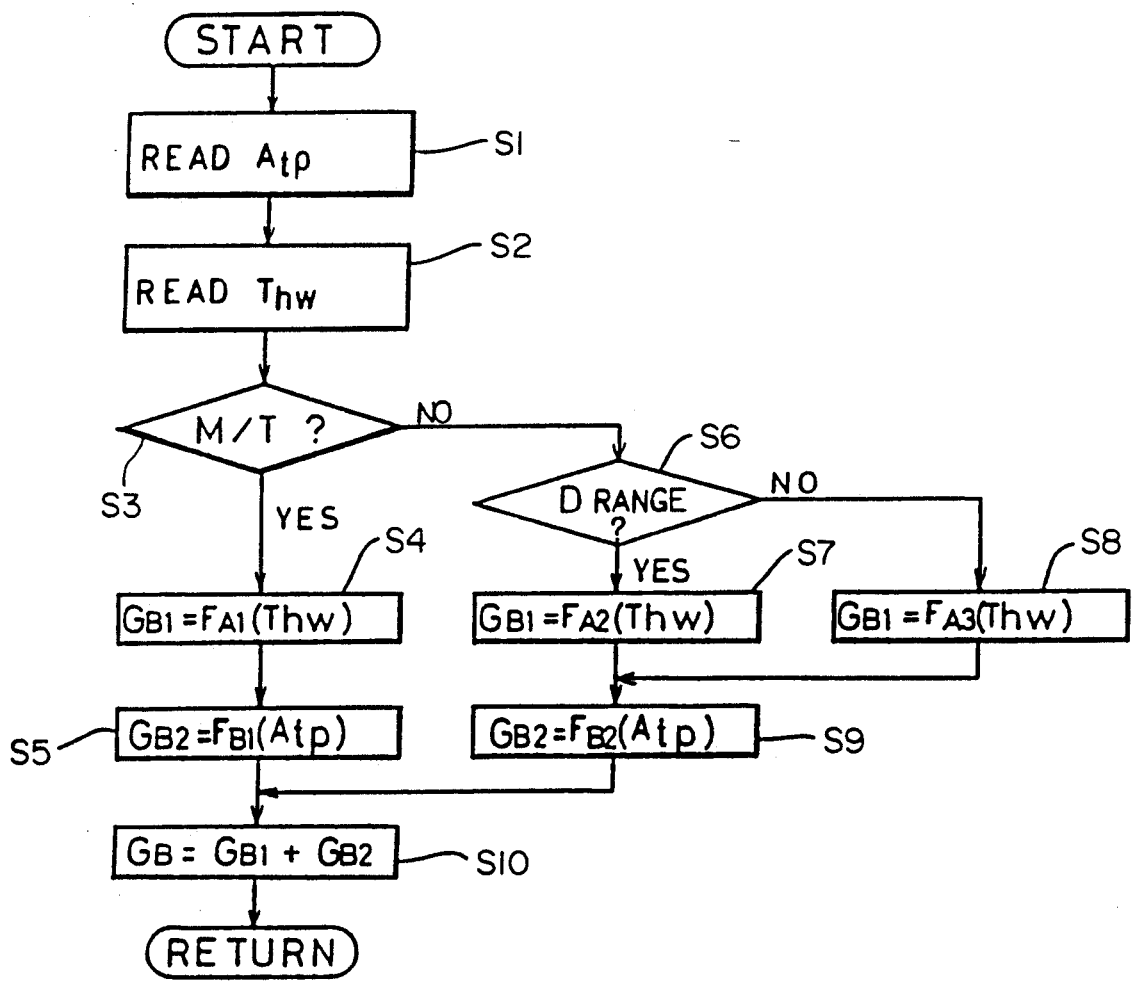
FIG. 2 is a flow chart showing a sequence for a microcomputer for controlling a first supplementary air control means.
Figure 4:
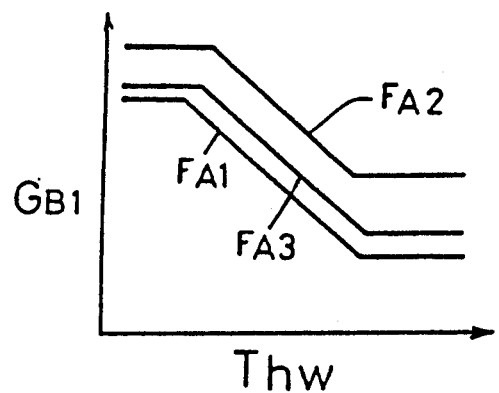
FIG. 4 is a graph of a valve control value GB1 relative to engine coolant temperature.
Figure 5:
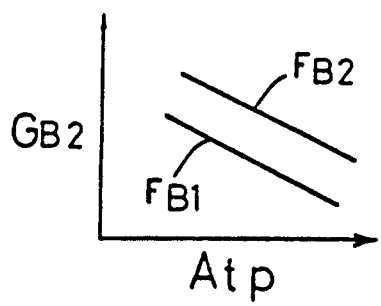
FIG. 5 is a graph of a valve control value GB2 relative to atmospheric pressure.

Referring to FIG. 2, shown therein is a flow chart of an ISC valve control for the microcomputer of the control unit 50 wherein steps S1 to S10 constitute first supplementary air control means for controlling the ISC valve 16A acting as supplementary air distribution means according to engine operating conditions and steps S5 and S9 constitute first supplementary air correcting means for correctively controlling the ISC valve 16A or the first supplementary air distribution means according to atmospheric pressure. First, the ISC valve control reads outputs from the atmospheric pressure sensor 44 and engine coolant temperature sensor 43 to detect atmospheric pressure Atp and engine coolant temperature Thw in steps S1 and S2, respectively. Thereafter, a decision is made in step S3 whether the transmission is of a manual type. If the answer to the decision is yes, indicating that the transmission is a manual transmission, coolant-depending control value GB1 and pressure-depending control value GB2 for controlling the ISC valve 16A are drawn from functions FA1 and FB1 shown in FIGS. 4 and 5 in steps S4 and S5, respectively. In step S10, the coolant-depending control value GB1 and pressure-depending control value GB2 are added together to provide an eventual valve-opening control value GB by which the ISC valve 16A is controlled to open.

If the answer to the decision is no, indicating that the transmission is an automatic transmission, a decision is made in step S6 as to whether the automatic transmission is in its drive range (abbreviated by D in FIG. 2). If in its drive range, the coolant-depending control value GB1 and pressure-depending control value GB2 for controlling the ISC valve 16A are drawn from functions FA2 and FB2 shown in FIGS. 4 and 5 in steps S7 and S9, respectively. In step S10, the coolant-depending control value GB1 and pressure-depending control value GB2 are added together to provide an eventual valve-opening control value GB. As apparent from FIG. 5, pressure-depending control values GB2 given by the function FB2 are always larger than those given by the function FB1 over the whole range of atmospheric pressure. In other words, the pressure-depending control value GB2 is larger for an automobile engine with an automatic transmission than for an automobile engine with a manual transmission. Accordingly, even if the difference between atmospheric pressure and boost pressure decreases so as thereby to insufficiently suck supplementary air through the bypass passage pipe 16 when an automobile equipped with the automobile engine with an automatic transmission is running at high elevations, the pressure-depending control value GB2 given by the function FB2 assures a large quantity of supplementary air flow into the intake manifold 10 through the bypass passage pipe 16.

On the other hand, if the answer to the decision in Step S6 is no, this indicates that the automatic transmission is not in its drive range, but rather in its neutral range. Then, after drawing the coolant-depending control value GB1 from a function FA3 shown, in FIG. 4, the pressure-depending control value GB2 is drawn from the function FB2 shown in FIG. 5. Finally, the coolant-depending control value GB1 and pressure-depending control value GB2 are added together to provide an eventual valve-opening control value GB in step 10. As apparent from FIG. 4, coolant-depending control values GB1 given by the function FA3 are always slightly larger than those by the function FA1 over the whole range of coolant temperatures. This is due to the fact that an oil pump produces a load additionally put on the automobile engine with an automatic transmission.

Figure 3:
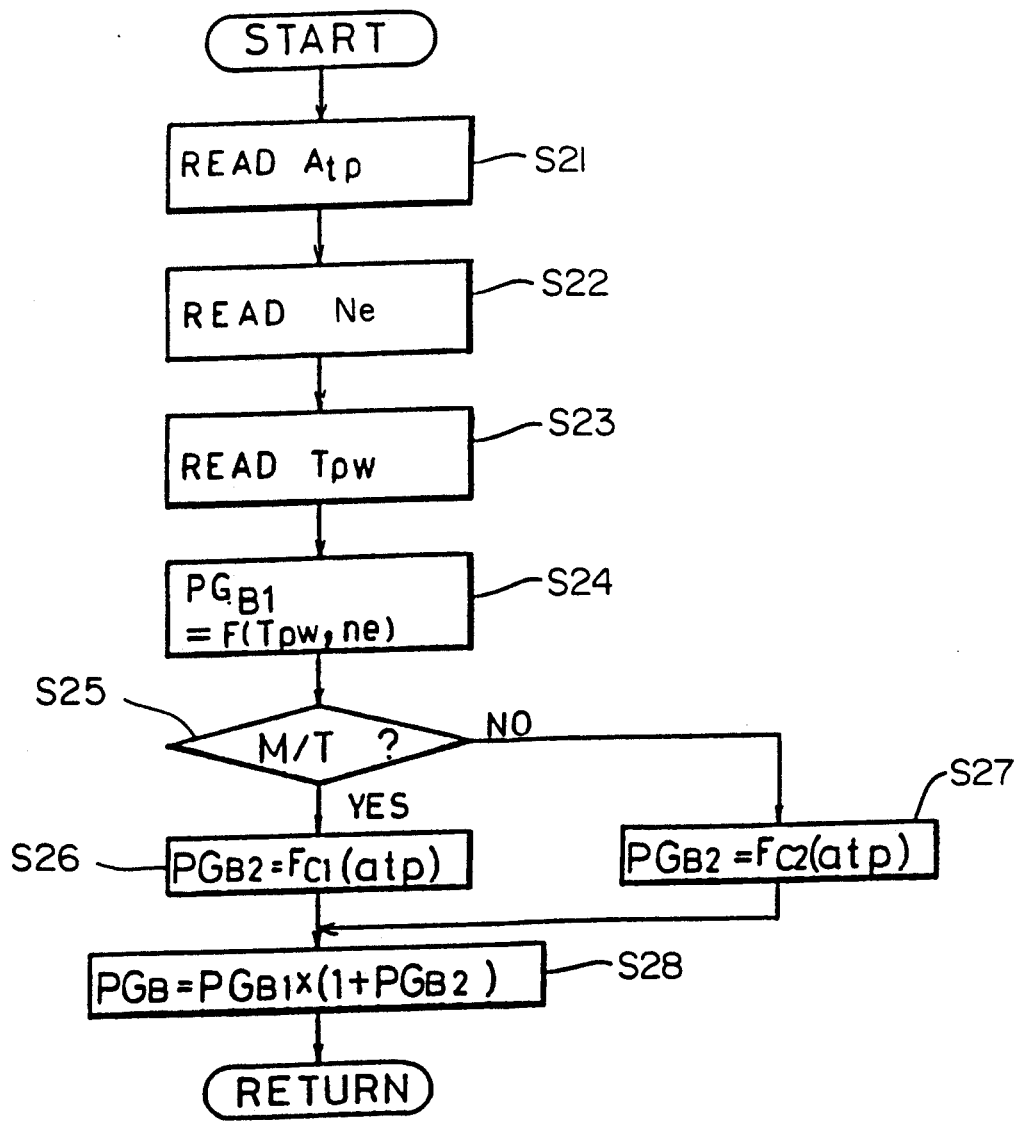
FIG. 3 is a flow chart showing a sequence for a microcomputer for controlling a second supplementary air control means.

Referring to FIG. 3, shown therein is a flow chart of an purge valve control for the micropluter of the control unit 50 wherein steps S21 to S28 constitute second supplementary air control means for controlling the purge valve 19 acting a supplementary air distribution means according to engine operating conditions and steps S26 and S27 constitute second supplementary air correcting means for correctively controlling the purge valve 19 or the supplementary air distribution means according to atmospheric pressure. In the purge valve control shown in FIG. 3, outputs from the atmospheric pressure sensor 44 and crank angle sensor 41, and a signal to the fuel injector 14 are read to detect or determine atmospheric pressure Atp, engine speed Ne and pulse width Tpw in steps S21, S22 and S23, respectively. In step S24, a basic valve control value PGB1 for controlling the purge valve 19 is drawn from a given function F(Tps,; Ne) according to the detected the engine speed Ne and pulse width Tpw. Thereafter, a decision is made in step S25 whether the transmission is of a manual type. If the answer to the decision is yes indicating a manual transmission, a pressure-depending control value PGB2 for controlling the purge valve 19 is drawn from a function FCI shown in FIG. 6 in step S26.

Figure 6:
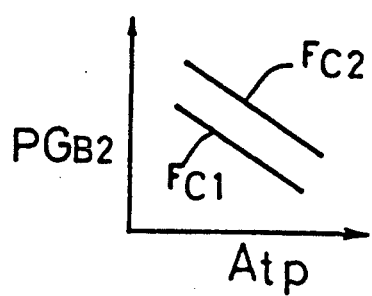
FIG. 6 is a graph of a valve control value PGB2 relative to atmospheric pressure.

If the answer to the decision regarding transmission type is no, indicating that the transmission is an automatic transmission, then, a pressure-depending control value PGB2 is drawn from a function FC2 shown in FIG. 6 in step S27.

In any event, after having obtained the pressure-depending control value PGB2 in step S26 or S27, an eventual valve-opening control value PGB by which the purge valve 19 is controlled to open is obtained in step S28 by calculating the following formula:

$$PGB = PGB \times (1 + PGB2)$$

As apparent from FIG. 6, pressure-depending control value PGB2 given by the function FC2 are always larger than those given by the function FC1 over the whole range of atmospheric pressure. That is, the pressure-depending control value PGB2 is larger for an automobile engine with an automatic transmission than for an automobile engine with a manual transmission. Accordingly, even if the difference between atmospheric pressure and boost pressure decreases so as thereby to insufficiently suck supplementary air containing evaporated fuel gas through the purge pipe 18 when an automobile equipped with the automobile engine with an automatic transmission is running on high elevations, the pressure-depending control value PGB2 given by the function FC2 ensures a large quantity of supplementary air flow into the intake manifold 10 through the purge pipe 19.

It is to be understood that whereas the invention has been described in detail with respect to a preferred embodiment, nevertheless various other embodiments and variants are possible which are within the spirit and scope of the invention, and such are intended to be covered by the following claims.

What is claimed is:

1. An intake system for an automobile engine with a manual transmission or an automatic transmission, said intake system comprising:

a throttle valve disposed in an intake passage of said intake system for distributing air into cylinders of said automobile engine;

supplementary air distribution means for distributing supplementary air into said intake passage between said throttle valve and automobile engine;

control means for controlling said supplementary air distribution means to distribute different amounts of said supplementary air according to operating conditions of said automobile engine; and a control unit for recognizing whether the transmission is a manual transmission or an automatic transmission, and controlling said control means so as to make corrections in an amount of said supplementary air distributed by said supplementary air distribution means into said intake passage according to atmospheric pressure and so as to distribute a larger amount of said supplementary air into said intake passage when an automatic transmission is recognized by said control unit than when a manual transmission is recognized by said control unit at a given atmospheric pressure.

2. An intake system as defined in claim 1, wherein said control unit further controls aid control means so as to make corrections in the amount of said supplementary air distributed by said supplementary air distribution means according to engine coolant temperature and so as to distribute a larger amount of said supplementary air into said intake passage when an automatic transmission is recognized by said control unit than when a manual transmission is recognized by said control unit at a given engine coolant temperature.

3. An intake system as defined in claim 1, wherein said supplementary air distribution means comprises a bypass passage for allowing air in said intake passage to bypass said throttle valve and said control means comprises an idle speed control valve disposed in said bypass passage for changing the amount of supplementary air flowing through said bypass passage.

4. An intake system as defined in claim 1, wherein said supplementary air distribution means comprises a purge passage coupling a fuel tank with said intake passage between said throttle valve and said automobile engine for allowing air to be distributed and said control means comprises a purge valve disposed in said purge passage for changing the amount of supplementary air flowing through said bypass passage.

5. An intake system as defined in claim 1, wherein said supplementary air distribution means includes first and second supplementary air distribution means, said first supplementary air distribution means comprises a bypass passage for allowing air in said intake passage to bypass said throttle valve, said control means comprises an idle speed control valve disposed in said bypass passage for changing the amount of supplementary air flowing through said bypass passage, said second supplementary air distribution means comprises a purge passage coupling a fuel tank with said intake passage between said throttle valve and said automobile engine for allowing air to be distributed, and said control means further comprises a purge valve disposed in said purge passage for changing the amount of supplementary air flowing through said purge passage.

6. An intake system as defined in claim 1, wherein said control unit further controls said control means so as to make corrections in the amount of said supplementary air distributed by said supplementary air distribution means so as to distribute a larger amount of said supplementary air into said intake passage when an automatic transmission is in a driving range than when the automatic transmission is in a neutral range at a given atmospheric pressure.

* * * * *